United States Patent [19]

McMaster

[11] Patent Number: 4,963,749

[45] Date of Patent: Oct. 16, 1990

[54] QUAD ELEMENT INTRUSION DETECTION

[75] Inventor: Richard L. McMaster, Pittsford, N.Y.

[73] Assignee: Detection Systems, Inc., Fairport, N.Y.

[21] Appl. No.: 316,764

[22] Filed: Feb. 28, 1989

[51] Int. Cl.[5] .................................... G01J 5/18

[52] U.S. Cl. .................................... 250/349; 250/342

[58] Field of Search ........... 250/349, 342, 392, 338 R, 250/338 PY, 338.1, 338.3; 340/567, 371

[56] References Cited

U.S. PATENT DOCUMENTS

| | | | |
|---|---|---|---|
| Re. 29,082 | 12/1976 | Schwarz | 340/258 D |
| 4,614,938 | 9/1986 | Weitman | 340/567 |
| 4,618,854 | 10/1986 | Miyake et al. | 340/567 |
| 4,697,081 | 9/1987 | Baker | 250/338 |
| 4,704,533 | 11/1987 | Rose et al. | 250/342 |
| 4,710,630 | 12/1987 | Kuppenheimer et al. | 250/353 |

*Primary Examiner*—Janice A. Howell
*Assistant Examiner*—Richard Hanig

[57] ABSTRACT

A dual channel intrusion detection system comprising first and second radiation sensors. Each sensor has a pair of elements viewing adjacent zones of the protected area, the zones being slightly offset from each other in the direction of expected intruder movement. Sequence detection is provided for producing an intruder-present signal in response to simultaneous actuation of one element of each sensor when preceded by actuation of the other element of one of the sensors. Additional immunity from false triggering is obtainable if this sequence must be followed by actuation of the other element of the second sensor.

8 Claims, 4 Drawing Sheets

FIGURE 1
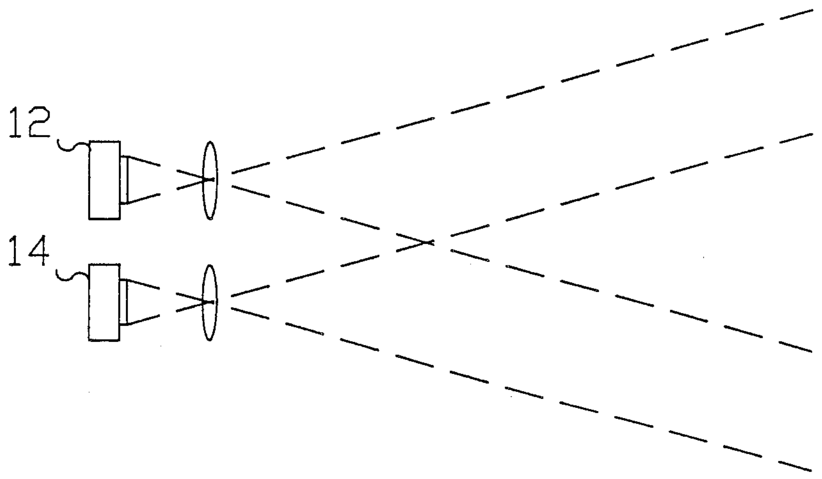
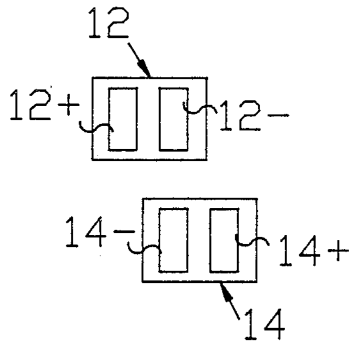
FIGURE 2

FIGURE 3
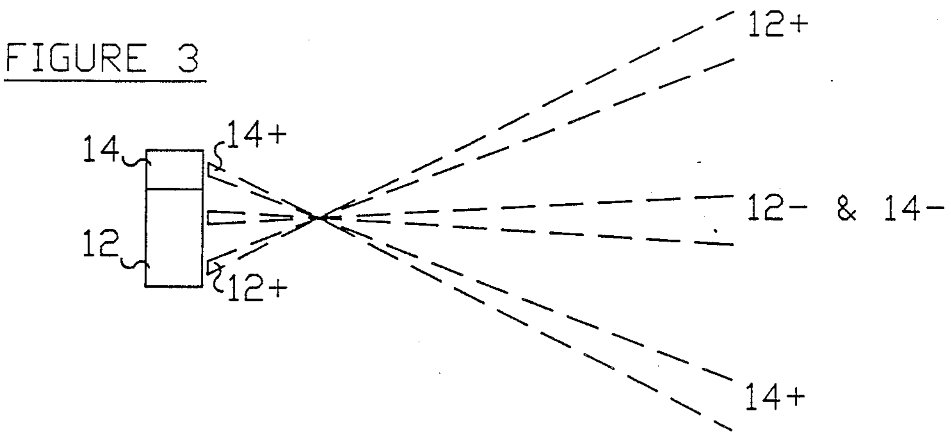
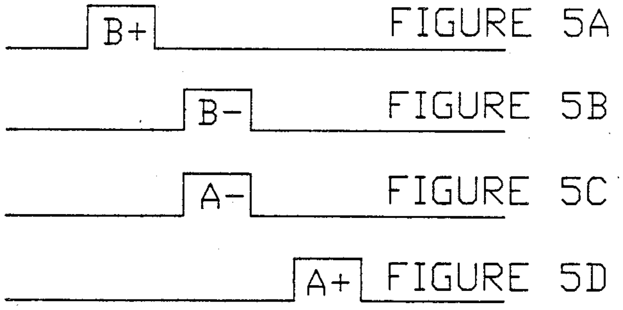
FIGURE 5A
FIGURE 5B
FIGURE 5C
FIGURE 5D

QUAD ELEMENT INTRUSION DETECTION

BACKGROUND OF THE INVENTION

1. Field of the Invention

The present invention relates generally to intrusion detection systems; and more particularly to such systems having a pair of sensors, each with two elements, and means responsive to a predetermined sequence of actuation of the elements to output an intruder-present signal.

2. Description of the Prior Art

Active intrusion detection systems typically include a radiation transmitting device and a separate sensor coupled to follow-on electronics for detecting disturbance of the received radiation. On the other hand, passive intrusion detection systems function by sensing a threshold change in the amount of radiation present whenever there is an intrusion into the protected area. However, such systems are susceptible to false intruder-present signal due to changes in ambient light, temperature changes, drafts, etc.

In an attempt to overcome the cause of such false signals, many such systems include a so called "dual element" sensor; which is a single sensor having a pair of opposite polarity elements which view closely adjacent portions of the protected area to produce polarized outputs characteristic of the change in infrared content of their respective fields of view. The dual elements are aligned sequentially in the direction of expected intrusion. When both elements are affected at the same time, their outputs are negated by mutual subtraction of the element outputs. Accordingly, the occurrence of false intruder-present signals resulting from changes in the ambient conditions is reduced. On the other hand, the logic produces an intruder-present signal in response to a sequence of opposite polarity pulses such as would be caused by an intruder walking across the field of view of the two elements.

Reliability of intrusion detection systems, and security from false intruder-present signals, has been enhanced with the advent of detection systems comprising two separate channels "A" and "B", each channel having an associated sensor with a pair of sensor elements as described above. By requiring that intruder-present signal outputs from both sensors are needed in order for the system to respond, the risk of false triggering from electrical noise or non-intruder related changes in infrared radiation sources is reduced because there is less likelihood of spurious signals occurring in both channels.

For example, U.S. Pat. No. 4,704,533, which issued to Rose et al. on Nov. 3, 1987, discloses a two channel (A and B), dual sensor intrusion detection system arranged such that interdigited polarized elements of the sensors create adjacent detection zones and produce outputs referred to as +A, −A, +B, and −B. An intruder recognition circuit responds to sequential activation of one element from each sensor. That is, the system will respond to a pattern comprised of +A alone, followed by +A together with +B, followed by +B alone. The system will also respond to a pattern comprised of −A alone, followed by −A together with −B, followed by −B alone. While this system of responding to particular patterns of output signals has certain benefits in detecting intruders, it requires that the elements of the two sensors be closely adjacent. Also, by requiring output signals from only two elements of the four element system to actuate an intruder-present signal, the risk of false signals is greater than if more than two elements had to be activated in proper sequence for an intruder-present signal to be produced.

SUMMARY OF THE INVENTION

It is an object of the present invention to provide an intrusion detector such that at least two sensing zones are created, with one zone being viewed by at least one element of each of a pair of two, dual element sensors.

In accordance with the above object, the present invention includes a dual channel intrusion detection system comprising first and second radiation sensors each having a pair of elements viewing adjacent zones and being arranged to view a protected area slightly offset from each other in the direction of expected intruder movement. Sequence detection means are provided for producing an intruder-present signal in response to simultaneous actuation of one element of each sensor when preceded by actuation of the second element of one of the sensors. Additional immunity from false triggering is obtainable if this sequence must be followed by actuation of the second element of the second sensor.

The invention and its various technical advantages will become apparent to those skilled in the art from the ensuing description, reference being made to the following drawings.

BRIEF DESCRIPTION OF THE DRAWINGS

FIG. 1 is a side elevational view of a detection system in accordance with the present invention;

FIG. 2 is a front elevation view of the system of FIG. 1;

FIG. 3 is a top plan view of the system of FIG. 1;

FIG. *5a* to *5d* are timing diagrams showing outputs of a portion of the system of FIG. 4.

DESCRIPTION OF THE PREFERRED EMBODIMENTS

Referring to FIGS. 1–3, an intrusion detector according to a preferred embodiment of the present invention includes a pair of dual pyroelectric sensors 12 and 14 having a pair of opposite polarity elements 12+ and 12−, and 14+ and 14−, respectively. The sensor elements produce polarized outputs characteristic of the change in infrared content of their respective fields of view. In the illustrated embodiment, elements 12+ and 14+ are of positive polarity and elements 12− and 14− are of negative polarity. However, one skilled in the art will understand from the following description that the present invention applies equally well if the polarity of the elements of sensor 12 and/or that of sensor 14 were reversed.

FIG. 1 is a side elevational view, and shows that sensors 12 and 14 are arranged to view vertically overlapping fields at any range beyond a very short distance determinable from the vertical spacing of the elements and the focal length of the lens system. From the top view of FIG. 3, it can be seen that the fields of view of elements 12− and 14− coincide, and that the fields of view of elements 12+ and 14+ are on either side of the fields of view of elements 12− and 14−. Thus, an intruder walking across the protected area (viewed from top to bottom in FIG. 3) would be "seen" first by element 12+, then substantially at the same time by elements 12− and 14−, and finally by element 14+.

Figure 4:
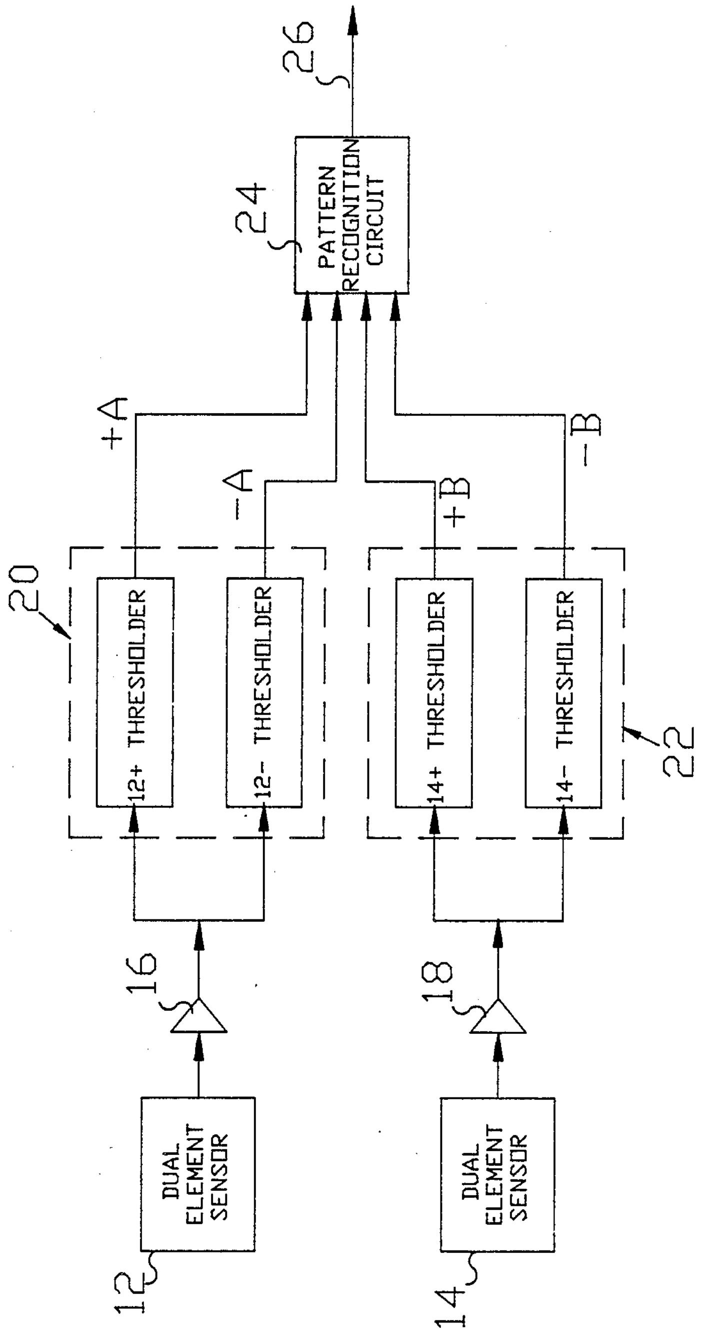
FIG. 4 is a schematic block diagram of the system of FIG. 1.

FIG. 4 shows the detection system. After amplification at 16 and 18, respectively, the outputs of sensors 12 and 14 are inputted to level detection circuits 20 and 22. Each level detection circuit comprises a positive and a negative thresholder. Each thresholder produces a digital output in response to an input voltage excursion of predetermined magnitude and appropriate polarity. The outputs of the thresholders are pulses labeled +A, −A, +B, and −B.

An intruder moving across the protected area from top to bottom as viewed in FIG. 3 would produce the following series of pulses from level detection circuits 20 and 22: +A, followed by substantially simultaneous −A and −B, followed by +B. In response to an intruder moving across the protected area in the other direction, (from bottom to top as viewed in FIG. 3) the following series of pulses would be produced from level detection circuits 20 and 22: +B, followed by substantially simultaneous −A and −B, followed by +A as indicated in FIGS. 5*a* to 5*d*.

The four outputs of level detection circuits 20 and 22 are connected to a pattern recognition circuit 24 which includes electronic logic circuits arranged to identify certain sequences of output signals from the level detection circuits indicative of an intruder, and to produce an intrusion signal 26 in response thereto.

In one embodiment of the present invention, the pattern recognition circuit is arranged to identify and respond to a pulse pattern of either +A or +B, followed by substantially simultaneous −A and −B. In a second embodiment, which adds greater immunity to false intruder-present signals, the pattern recognition circuit is arranged to identify and respond to a Pulse pattern of either +A or +B, followed by substantially simultaneous −A and −B, followed by the other of +A or +B. Of course these sequences of pulses from the level detection circuits are selected based on the arrangement of sensor elements as shown in FIGS. 1-3. Other arrangements of elements would require different logic within the pattern recognition circuit, all within the skill of a skilled worker in the field.

Figure 6:
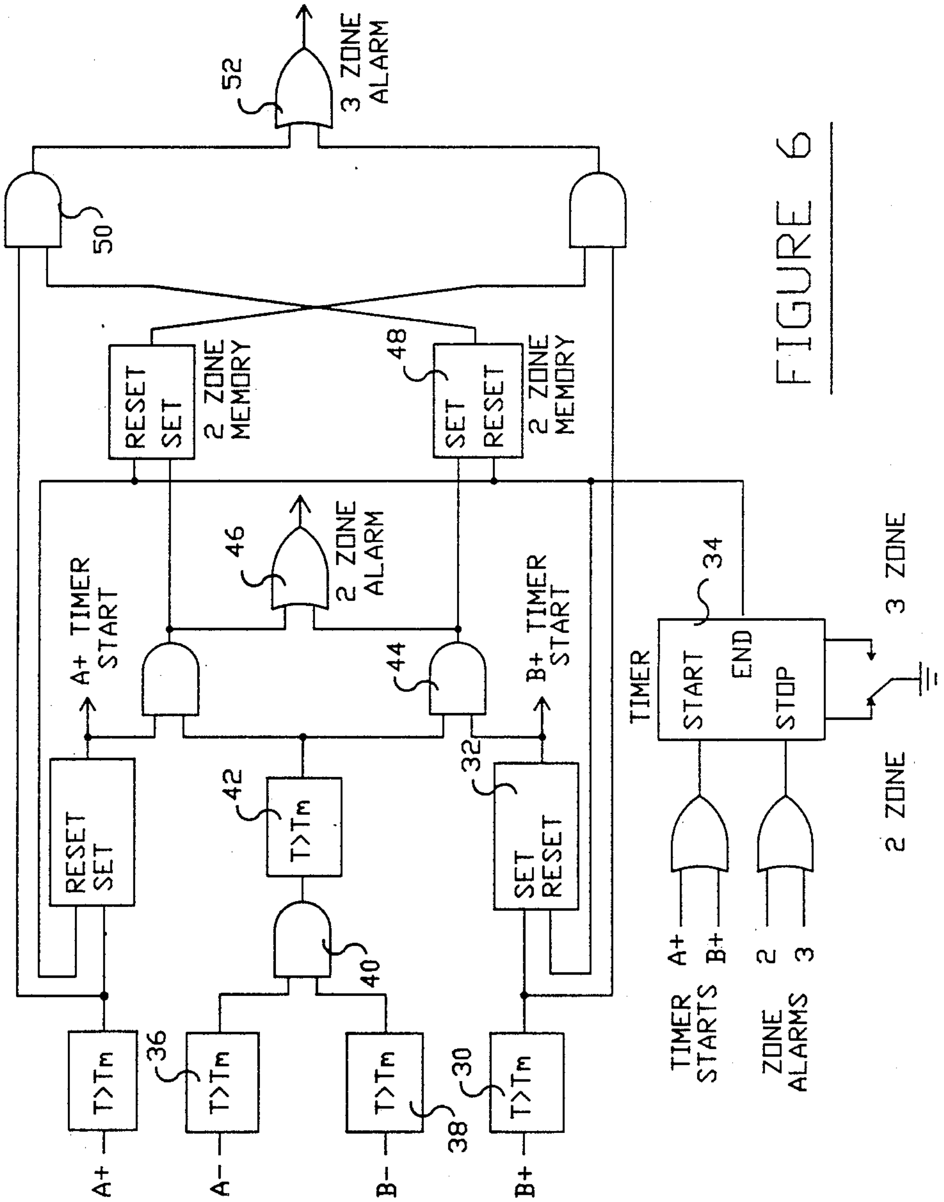
FIG. 6 is a schematic diagram of a circuit forming part of the system of FIG. 4.

FIG. 6 shows a preferred embodiment of pattern recognition circuit 24 (FIG. 4) in greater detail. Assuming that an intruder moves across the protected area from bottom to top as viewed in FIG. 3, level detector circuits 20 and 22 will produce a +B pulse, followed by simultaneous pulses −A and −B, followed by an +A pulse. The duration "T" of each pulse is qualified as being greater than some predetermined minimum duration $T_m$.

When the +B pulse occurs and is qualified at 30, a memory element 32 is set and a timer 34 is started. Upon the subsequent qualification of −A and −B pulses at 36 and 38, respectively, an AND gate 40 checks for coincidence and its output is further qualified at 42.

If AND gate 40 has a qualified output after memory 32 is set, an AND gate 44 notes the simultaneous occurrence of −A and −B pulses along with a stored memory of a +B pulse, and provides an output to an OR gate 46 to set off the alarm if in the "two zone" mode and within the two-zone limit of timer 34.

If however, the system were in a "three zone" mode which required an occurrence of a final +A pulse to trip the alarm, the output of AND gate 44 sets a second memory element 48. Now, upon the occurrence of an +A pulse, an AND gate 50 emits a signal to an OR gate 52 to set off the alarm if within a specified three-zone time limit of timer 34.

While the diagram of FIG. 6 has been explained with respect to an intruder walking through the protected zone in one direction, it will readily be apparent how the system responds to an intruder who enter the area from the opposite side.

The invention has been described in detail with particular reference to preferred embodiments thereof, but it will be understood that variations and modifications can be effected within the spirit and scope of the invention.

What is claimed is:

1. A dual channel intrusion detection system comprising:

a first radiation sensor having a pair of elements viewing adjacent zones slightly offset from each other in the direction of expected intruder movement;

a second radiation sensor having a pair of elements viewing adjacent zones slightly offset from each other in the direction of expected intruder movement; and sequence detection means for producing an intruder-present signal in response to substantially simultaneous actuation of one of the elements of each sensor when preceded by actuation of the other element of only one of the sensors.

2. A detection system as defined in claim 1 wherein said one elements of said sensor are vertically aligned to observe substantially the same zone of the protected area.

3. A dual channel intrusion detection system comprising:

first and second radiation sensors each sensor having a pair of elements viewing adjacent zones, said elements of each sensor being arranged to view a zone of a protected area slightly offset from each other in the direction of expected intruder movement; and sequence detection means for producing an intruder-present signal in response to simultaneous actuation of a first element of each sensor when preceded by actuation of the second element of one sensor and followed by actuation of the second element of the other sensor.

4. A dual channel intrusion detection system comprising:

first and second infrared sensors each sensor having a pair of opposite polarity elements viewing adjacent zones, said elements of each sensor being arranged to view a zone of a protected area slightly offset from each other in the direction of expected intruder movement such that an intruder will sequentially actuate:

(a) a first element of one of said sensors, and (b) simultaneously, a second element of said one sensor and a first element of the other of said sensors; and sequence detection means for producing an intruder-present signal in response to simultaneous actuation of said second element of said one sensor and said first element of said other sensor when preceded by actuation of one of said first element of said one sensor or said second element of said other sensor.

5. A dual channel intrusion detection system comprising:

first and second infrared sensors each sensor having a pair of opposite polarity elements viewing adjacent zones, said elements of each sensor being arranged to view a zone of a protected area slightly offset from each other in the direction of expected intruder movement such that an intruder will sequentially actuate:

(1) a first element of one of said sensors, (2) simultaneously, a second element of said one sensor and a first element of the other of said sensors, and (3) the second element of said other sensor; and sequence detection means for producing an intruder-present signal in response to simultaneous actuation of said second element of said one sensor and said first element of said other sensor when preceded by actuation of one of said first element of said one sensor or said second element of said other sensor and followed by actuation of the other of said first element of said one sensor or said second element of said other sensor.

6. A dual channel intrusion detection system comprising:

a first infrared sensor having a pair of opposite polarity elements viewing closely adjacent zones such that, in response to a change in infrared radiation sensed, the output of one of the elements is a positive "+A" signal and the output of the other one of the elements is a negative "−A" signal;

a second infrared sensor having at least one element viewing a zone substantially identical to one of the zones viewed by one of the elements of said first sensor to produce, in response to a change in infrared radiation sensed, an output "B" signal; and logic means for producing an intruder-present signal upon sequential production of one of said "−A" or "+A" signals followed by substantially simultaneous production of the other of said "−A" or "+A" signals together with said "B" signal.

7. A dual channel intrusion detection system comprising:

a first infrared sensor having a pair of opposite polarity elements viewing closely adjacent zones such that, in response to a change in infrared radiation sensed, the output of one of the elements is a positive "+A" signal and the output of the other one of the elements is a negative "−A" signal;

a second infrared sensor having a pair of opposite polarity elements viewing closely adjacent zones such that, in response to a change in infrared radiation sensed, the output of one of the elements is a positive "+B" signal and the output of the other one of the elements is a negative "−B" signal, and at least one element of said second sensor views a zone substantially identical to one of the zones viewed by one element of said first sensor; and logic means for producing an intruder-present signal upon sequential production of one of said "−A" or "+A" signals followed by substantially simultaneous production of the other of said "−A" or "+A" signals together with one of said "−B" or "+B" signals.

8. A dual channel intrusion detection system comprising:

a first infrared sensor having a pair of opposite polarity elements viewing closely adjacent zones such that, in response to a change in infrared radiation sensed, the output of one of the elements is a positive "+A" signal and the output of the other one of the elements is a negative "−A" signal;

a second infrared sensor having a pair of opposite polarity elements viewing closely adjacent zones such that, in response to a change in infrared radiation sensed, the output of one of the elements is a positive "+B" signal and the output of the other one of the elements is a negative "−B" signal, and at least one element of said second sensor viewing a zone substantially identical to one of the zones viewed by said first sensor; and logic means for producing an intruder-present signal upon sequential production of one of said "−A" or "+A" signals, followed by substantially simultaneous production of the other of said "−A" or "+A" signals together with one of said "−B" or "+B" signals, and followed by production of the other of said "−B" or "+B" signals.

* * * * *